United States Patent [19]

Yamazaki et al.

[11] Patent Number: 5,069,531
[45] Date of Patent: Dec. 3, 1991

[54] LIQUID CRYSTAL DEVICE HAVING ASYMMETRICAL OPPOSED CONTIGUOUS SURFACES BEING DRIVEN BY A UNIPOLAR DRIVING SOURCE

[75] Inventors: Shunpei Yamazaki, Tokyo; Toshimitsu Konuma, Atsugi; Toshiji Hamatani, Atsugi; Akira Mase, Atsugi; Toshiharu Yamaguchi, Zama; Mitsunori Sakama, Hiratsuka; Takashi Inujima, Atsugi, all of Japan

[73] Assignee: Semiconductor Energy Laboratory Co., Ltd., Kanagawa, Japan

[21] Appl. No.: 385,927

[22] Filed: Jul. 27, 1989

Related U.S. Application Data

[63] Continuation-in-part of Ser. No. 928,489, Nov. 10, 1986, abandoned.

[30] Foreign Application Priority Data

Nov. 11, 1985 [JP] Japan .................. 60-252426

[51] Int. Cl.⁵ .............................................. G02F 1/13
[52] U.S. Cl. ................................. 359/55; 359/84; 359/75; 359/104
[58] Field of Search ............. 350/339 R, 350 S, 334, 350/336, 337, 332, 333, 341

[56] References Cited

U.S. PATENT DOCUMENTS

| | | | |
|---|---|---|---|
| 4,252,414 | 2/1981 | Kinugawa et al. | 350/339 R |
| 4,367,924 | 1/1983 | Clark et al. | 350/334 |
| 4,617,646 | 10/1986 | Yang | 350/350 S |
| 4,633,012 | 12/1986 | Taguchi et al. | 350/350 S |
| 4,634,226 | 1/1987 | Isogai et al. | 350/350 S |
| 4,638,310 | 1/1987 | Ayliffe | 350/350 S |
| 4,662,721 | 5/1987 | Harada et al. | 350/339 R |
| 4,691,995 | 9/1987 | Yamazaki et al. | 350/331 R |
| 4,712,873 | 12/1987 | Kanbe et al. | 350/337 |
| 4,730,903 | 3/1988 | Yamazaki et al. | 350/334 |
| 4,904,064 | 2/1990 | Lagerwall et al. | 350/350 S |

FOREIGN PATENT DOCUMENTS

| | | | |
|---|---|---|---|
| 0186970 | 7/1986 | European Pat. Off. | |
| 3508169 | 9/1985 | Fed. Rep. of Germany. | |
| 0151055 | 11/1979 | Japan | 350/339 R |
| 0091627 | 5/1986 | Japan | 350/334 |
| WO85/02914 | 7/1985 | PCT Int'l Appl. | |

OTHER PUBLICATIONS

Clark et al., "Ferroelectric Liquid Crystal Electro-Optics Using the Surface Stabilized Structure", 1983, vol. 94, pp. 213-234.

IBM Technical Disclosure Bulletin, vol. 16, No. 2, Jul. 1973, pp. 395-396; Armonk, N.Y., U.S., "Liquid Crystal Cell Filling", H. D. Edmonds et al.

Applied Physics Letters, vol. 36, No. 11, Jun. 1, 1980, pp. 899-901, N. A. Clark et al.: "Submicrosecond bistable Electro-Optic Switching in Liquid Crystals".

Primary Examiner—Stanley D. Miller
Assistant Examiner—Trong Phan
Attorney, Agent, or Firm—Sixbey, Friedman, Leedom & Ferguson

[57] ABSTRACT

A liquid crystal device including a unipolar driving source; a pair of substrates, at least one of which is transparent; a chiral smectic liquid crystal layer interposed between the substrates; and an electrode arrangement provided in order to apply an electric field normal to the liquid crystal layer, wherein the opposed inner surfaces of the substrates contiguous to the chiral smectic liquid crystal layer are formed of different materials having different surface energies such that upon application of the unipolar voltage to the chiral smectic liquid crystal, the chiral smectic liquid crystal molecules will be placed in a first state and upon removal of the unipolar voltage, the liquid crystal molecules will be returned to a second state.

8 Claims, 3 Drawing Sheets

LIQUID CRYSTAL DEVICE HAVING ASYMMETRICAL OPPOSED CONTIGUOUS SURFACES BEING DRIVEN BY A UNIPOLAR DRIVING SOURCE

This application is a continuation-in-part of Ser. No. 06/928,489, filed Nov. 10, 1986, now abandoned.

BACKGROUND OF THE INVENTION

The present invention relates to liquid crystal devices and manufacturing method thereof and, more particularly, to a novel liquid crystal device and manufacturing method for same, with a long life time of the device available at a low cost.

Liquid crystal devices such as compact displays having light weight are broadly used in the fields of microcomputers, word processors, compact television systems etc. For instance, the display operates best in the parallel nematic configuration. Wherein the elongated axes of both the liquid crystal molecules, light-absorbing dichroic dye molecules are aligned in the same direction parallel to the wall of the display cell, in the electrically unexited state. In this condition, the molecules in cooperation with polarizer absorb the majority of incident light, and render the background of the display, as well as any unactivated pixels, to a dark condition. The pixels are electrically exited to align the molecules perpendicular to the cell walls and achieve less-absorbing state displaying relatively bright area against the dark background. Thus, the pixels can be energized between bright and dark conditions.

Such liquid crystal displays are usefull especially for a diplay a large panel area which includes 200×400 pixels for example. As one of liquid crystals available for the displays, twisted nematic type has been used frequently. Liquid crystal of this type is not so susceptible to impurity such as alkali metal contained in opposed glass substrates, especially impurity contained in a conductive transparent layer such as sodium, phosphorus or boron.

Recently, on the other hand, liquid crystals of other type has been reported as promising materials for some liquid crystal appliances. For instance, chiral smectic phase is coming to fruition in some fields. The smectic phase, however, imparts high viscosity to liquid crystal at a room temperature so that it is necessary to lower the viscosity by raising the temperature of the liquid crystal up to 120° to 150° C. to charge the liquid crystal into the narrow space between opposed substrates. Because of this, the high temperature undesirably promotes diffusion of impurity such as sodium into the liquid crystal from a conductive transparent electrode or a glass substrate contiguous to the liquid crystal. In case of a passive device, both the opposed insides of the substrates are in contact with the liquid crystal, making the device degraded during long time use at a range between a room temperature and 50° C. In case of active device, while the active element provision side of the device can be covered with a high purified polyimide, the opposite inside is exposed to the liquid crystal.

SUMMARY OF THE INVENTION

In order to solve the above problems, a liquid crystal device according to the invention is provided with an impurity blocking film on the inside of the space of the device for containing the liquid crystal, particular on a glass substrate or a conductive transparent electrode. The blocking layer is to be prepared in advance of filling process of liquid crystal. The suitable materials for the blocking layer are nitrides, for example, silicon nitride, aluminium nitride, boron nitride, magnesium nitride, tin nitride, antimony nitride, indium nitride or blended composition thereof.

It is therefore an object of the invention to provide a liquid crystal device having high performance without suffering contamination of the liquid crystal in the device.

It is another object of the invention to provide a method for processing liquid crystal devices having high performance.

BRIEF DESCRIPTION OF THE INVENTION

DETAILED DESCRIPTION OF THE PREFERRED EMBODIMENTS

Figure 1:
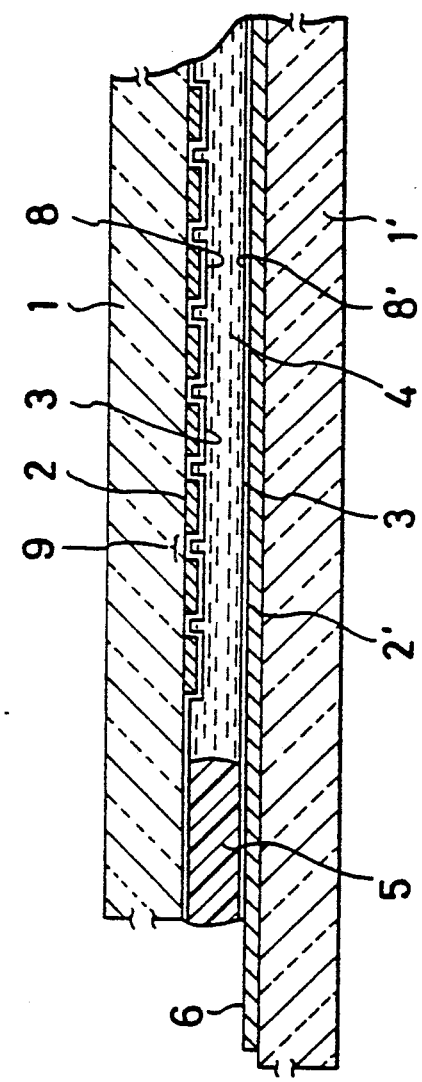
FIG. 1 is a cross section view showing a liquid crystal display according to the invention.

Referring to FIG. 1, a liquid crystal display of passive type according to the invention is illustrated. The embodiment comprises opposed substrates 1 and 1' of glass panes such as Corning 7059 on whose insides 8 and 8' are formed a plurality of electrode strips 2 arranged parallel with each other and a plurality of electrode strips 2' also arranged parallel with each other and extending perpendicular to the strips 2. The distance between the substrates 1 and 1' is 0.5 to 4 micron meter. A room or space is defined between the substrates 1 and 1' in air tight manner with a sealing means (not shown in the figure). Between the electrode strips 2 (2') and the substrate 1 (1') or the liquid crystal layer 4 of smectic C phase disposed therebetween, color filters may be provided to make the device a color display, if desired. The contiguous surfaces to the liquid crystal are the inside surfaces of the electrode strips 2 and 2' and the inside surfaces 9 of the substrate 1 and 1' which are provided and exposed between adjacent ones of the electrode strips. On the contiguous surfaces are formed silicon nitride films 3 and 3' with 20 to 2000 Å, 200 Å in thickness for example.

Liquid crystal material between the substrates 1 and 1' is a blend of ferroelectric liquid crystal such as S8 (P-ochtyloxybenzylidene P'-aminomethylebuthylbenzoate) and B8 (2-methylbuthyl-4-ochtyloxybiphenylcarboxylate), DOBAMBC (2-dechtyloxybenzilidene-4-aminomethylbuthylcinnamate) or other liquid crystals and blends thereof. For reference, some ferroelectric liquid crystals are shown in Japanese Patent Laid Open Nos. 56-107216, 56-118745 and 59-98051.

Although not shown in the figure, the contiguous surfaces are oriented, for example, by rubbing. Instead, the oriented surface may be present by further provision of oriented film over the silicon nitride film. In the case, most contiguous surfaces are the oriented films in place of the silicon nitride films. Furthermore provided below the silicon nitride may be disposed a shadow treatment mask for black matrix, an active device or so on.

The charging process of the liquid crystal material is carried out according to either of the following two methods.

According to the first method, the substrates 1 and 1' are assembled in advance opposing to each other with the silicon nitride films 8 and 8'. The periphery of the assembly is sealed off by a sealing member 5 made of epoxy resin except an injection aperture as an access. Next, the injection aperture is dipped into an amount of liquid crystal under negative pressure in a vacuum chamber and the liquid crystal is heated to 120° to 150° C. Then, the pressure in the chamber is returned to the atmospheric pressure. In virtue of differential pressure between the atmospheric pressure and the inside of the room between the opposed substrates to be charged liquid crystal, the liquid crystal is let enter into the cavity. Finally the aperture is closed by sealing material to prevent the liquid crystal from being contaminated by impurity in atmosphere and from leakage.

Although depending on the area of the display, it takes several hours to complete the filling process, normally 1 to 30 hours. The substrate and the liquid crystal material are in contact at the high temperature during the filling process. However, since the silicon nitride films are disposed as blocking layers between the liquid crystal and the substrates, no impurity is to enter the liquid crystal from the substrates or the conductive transparent layer.

According to the second method, an amount of liquid crystal is placed on one of the substrates in advance of assembling of the substrates 1 and 1'. The substrate with the amount of liquid crystal is mated with the counterpart substrate under negative pressure in a vacuum chamber. Simultaneously the substrate is heated to 120° to 150° C. Finally the periphery of the substrates is sealed off with sealing means.

Anyway, the liquid crystal has a low viscosity during the charging step in virtue of the high temperature and the desired characteristics of the liquid crystal for operation of the device is recovered at a room temperature. For instance, the liquid crystal assumes of isotropic state having low viscosity at a high temperature during the filling step and smectic phase having high viscosity at room temperature.

Figure 2:
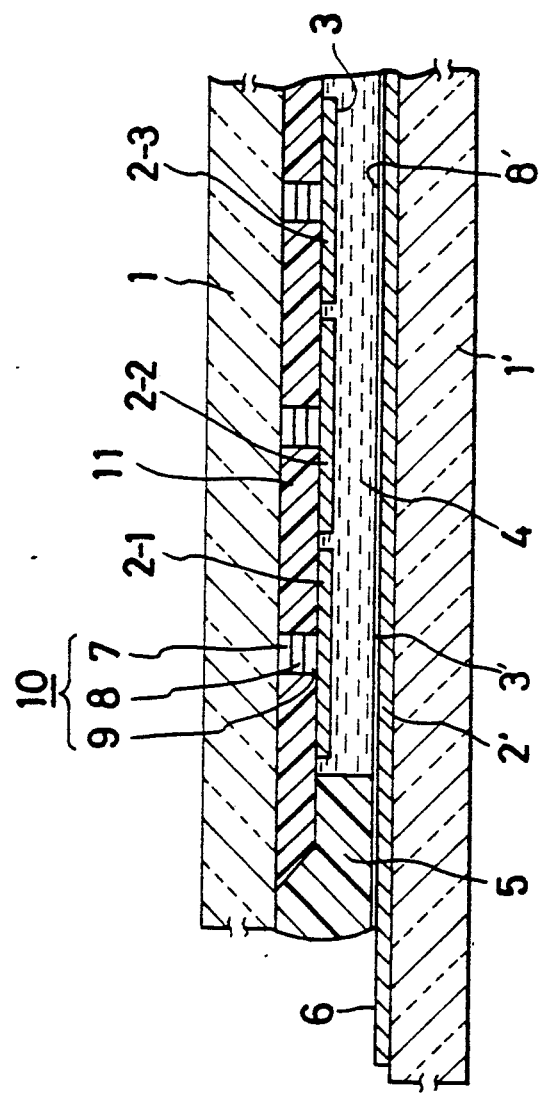
FIG. 2 is a cross section view showing another embodiment of the invention.

Next, another embodiment of the invention will be described in conjunction with FIG. 2. On a substrate 1 are formed a plurality of nonlinear active elements, each being composed of electrodes 7 and 9 made of chromium and semiconductor layer 8 having n-i-n junctions therebetween. Further formed on the substrate 1 is a polyimide resin layer 11 adjacent to the nonlinear elements 10. The polyimide resin is immune to ion drift. Transparent electrodes 2-1, 2-2, ... are formed on the resin layer 11 corresponding to each active element. Liquid crystal device of this type is shown in Japanese Patent Laid-Open No. 59-277414 applied by the applicant.

On the other substrate are electrode strips 2' having terminal ends for making contacts with circumferential circuitry and a silicon nitride films 8' as blocking layers with 200 Å in thickness. Liquid crystal to be charged into the space between the opposed substrates and charging method thereof are same as that of the foregoing embodiment so that redundant explanations will not be repeated. According to experiments, memory devices of the invention did not show no degraded property after the device has been used for 1000 hours.

One side or both sides of the liquid crystal layer, a polarizing plate may be placed with the liquid crystal being of guest-host type or birefringent type. In case of a reflection type device, an electrode on the incident side is made transparent and the other reflective with only one polarizer. The liquid crystal layer can be of a guest-host type with an additive, for example, 3% of dye or pigment such as dichroic anthraquinone. High contrast will be seen when the tilted angle of liquid crystal is 45 degrees.

On the other hand, in case of a device of transmissive type or reflective type with a birefringent liquid crystal layer, a pair of polarizers are placed on the both outsides of the opposed substrates. In the case, a desirable tilted angle is about 22.5 degrees.

Figure 3:
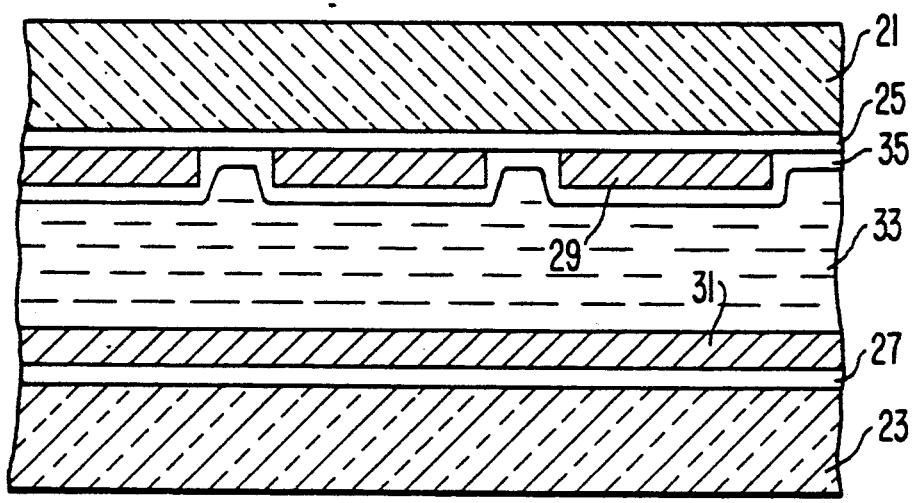
FIG. 3 is a cross section view showing a third embodiment of the invention.

FIG. 3 is directed to a third embodiment of the invention wherein the display can be operated by unipolar driving control. A liquid crystal device in accordance with this embodiment comprises a pair of glass substrates 21 and 23 of 1.1 mm thickness, $SiO_2$ ion blocking films 25 and 27 of 100 Å thickness, first electrode parallel strips 29 formed on the ion blocking film 25 and extending normal to the drawing sheet, second electrode parallel strips 31 formed on the ion blocking film 27 and extending in the lateral direction. These strips are made of ITO films of 1000 to 1500 Å thicknesses. The first and second strips form a matrix arrangement of pixels therebetween. A ferroelectric liquid crystal layer 33 is interposed between the substrates.

Figure 4:
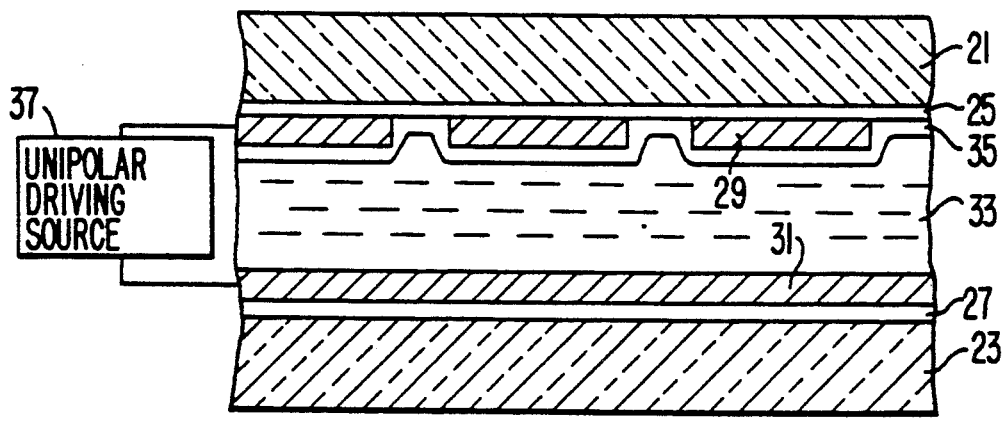
FIG. 4 is a cross section view corresponding to FIG. 3 and further illustrating a unipolar driving source.

A polyimide film 35 is coated on the ion blocking film 25 over the electrode strips 29. The polyimide film 35 given rubbing treatment and functions as an orientation control film during the disposing process of the liquid crystal material. The opposite surfaces of the electrode strips 31 are not coated with such an organic resin film. Namely, as seen from the liquid crystal layer between the substrates, the opposed contiguous surfaces are asymmetrical. This is of great importance for a unipolar driving scheme as illustrated at 37 in FIG. 4.

By virtue of differential surface energy between the polyimide film 35 and the ITO electrode strips 31, the dielectric moments of the liquid crystal molecules are forced toward one of these surfaces. The molecules, which have been aligned in light of the orientation control film 35, can take up two stable positions in two alignment directions if the two contiguous surfaces have the same surface energy. The differential surface energy between the polyimide film 35 and the ITO electrode strips, however, makes the liquid crystal molecules preferentially take up one of the stable positions and the optical condition of the liquid crystal layer be kept constant.

An electric field in a certain direction can force the liquid crystal molecules to take the other position and change the optical condition of the liquid crystal uniformly at addressed pixels. The liquid crystal layer can resume the stable condition due to the differential surface energy when the electric field is removed. Namely, the liquid crystal device is operated by applying a suitable electric field to the liquid crystal layer and removing the electric field. This is the unipolar driving. A polarizing plate 35 completes the display device.

While the invention has been particularly shown and described with reference to preferred embodiments thereof, it will be understood by those skilled in the art that the foregoing and other modifications and changes in form and details may be made therein without departing from the appending claims. Some examples are disclosed as follows.

As substrates to have an amount of liquid crystal therebetween, a pair of flexible sheet may be employed. For instance are chemically strengthened thin glass substrates with 0.3 to 0.6 mm in thickness and transparent heat-proof organic resin films made of such as polyimide, PAN and PET.

Active elements may be SCLAD (Space Charge Limited Amourphous Silicon Device) having a multijunction diode such as a n-i-n type diode or FETs of insulated gate type.

The invention may be applied to other liquid crystal appliances, for example, disc memories, speakers, infrared light sensor printers, or input device in which are formed a plurality of photo sensors arranged in the form of dots.

What is claimed is:

1. A liquid crystal device comprising:
   a unipolar driving source;
   a pair of substrates, at least one of which is transparent;
   a chiral smectic liquid crystal layer interposed between said substrates; and
   an electrode arrangement provided in order to apply an electric field normal to said liquid crystal layer,
   wherein the opposed inner surfaces of said substrates contiguous to said chiral smectic liquid crystal layer are formed of different materials having different surface energies such that upon application of the unipolar voltage to said chiral smectic liquid crystal, the chiral smectic liquid crystal molecules will be placed in a first state and upon removal of the unipolar voltage, the liquid crystal molecules will be returned to a second state.

2. The device of claim 1 wherein one of said inner surfaces is provided with an orientation control film contiguous to said liquid crystal layer.

3. The device of claim 2 wherein said orientation control film is made of an organic resin while the other contiguous surface is the inner surface of said electrode arrangement.

4. The device of claim 3 wherein said organic resin is polyimide.

5. The device of claim 1 wherein said electrode arrangement comprises first electrode parallel strips formed on one of said substrates and second electrode parallel strips formed on the other substrate, said first and second strips forming a matrix arrangement therebetween.

6. A device as in claim 1 including a nonlinear active element interposed between said chiral smectic liquid crystal layer and one of said substrates.

7. A device as in claim 6 where said active element includes a semiconductor layer having n-i-n junctions.

8. A device as in claim 1 where said chiral smectic liquid crystal layer is ferroelectric.

* * * * *